United States Patent [19]
Moritan

[11] Patent Number: 5,635,781
[45] Date of Patent: Jun. 3, 1997

[54] BRUSHLESS MOTOR WITH AN IMPROVED CONNECTOR TERMINAL

[75] Inventor: Norishige Moritan, Tottori-ken, Japan

[73] Assignee: Matsushita Electric Industrial Co., Ltd., Osaka-fu, Japan

[21] Appl. No.: 361,097

[22] Filed: Dec. 21, 1994

[30] Foreign Application Priority Data

Dec. 22, 1993 [JP] Japan .................................. 5-325090

[51] Int. Cl.⁶ .................................................. H02K 11/00
[52] U.S. Cl. .......................... 310/71; 310/67 R; 310/91; 310/254; 310/259
[58] Field of Search .......................... 310/71, 91, 67 R, 310/254, 259

[56] References Cited

U.S. PATENT DOCUMENTS

| | | | |
|---|---|---|---|
| 4,518,886 | 5/1985 | Kaneyuki | 310/71 |
| 4,847,528 | 7/1989 | Eguchi et al. | 310/239 |
| 4,866,317 | 9/1989 | Katayama | 310/89 |
| 4,892,418 | 1/1990 | Asada et al. | 384/124 |
| 5,057,732 | 10/1991 | Fukaya | 310/208 |
| 5,173,628 | 12/1992 | Yoshida et al. | 310/71 |
| 5,214,331 | 5/1993 | Yonei | 310/71 |
| 5,256,922 | 10/1993 | Tanaka et al. | 310/71 |
| 5,382,855 | 1/1995 | Cousin | 310/71 |
| 5,389,846 | 2/1995 | Okazaki et al. | 310/40 MM |
| 5,481,144 | 2/1996 | Dunfield et al. | 310/71 |

FOREIGN PATENT DOCUMENTS

| | | |
|---|---|---|
| 63-74070 | 5/1988 | Japan . |
| 5-38119 | 2/1993 | Japan . |

*Primary Examiner*—Steven L. Stephan
*Assistant Examiner*—Elvin G. Enad
*Attorney, Agent, or Firm*—Wenderoth, Lind & Ponack

[57] ABSTRACT

A brushless motor includes a coil for energizing a motor to thereby rotate a rotor of the motor, a core having a plurality of projection poles around which the coil is wound, a terminal pin serving as a relay in feeding electric current to the coil, a lead wire extending from a terminal end of the coil, and a bracket for fixedly holding the core. The lead wire is electrically connected with the terminal pin directly or indirectly fixed to the core; and the terminal pin is extended to outside of the motor through a through-hole of the bracket so as to electrically connect with a motor driving circuit.

20 Claims, 7 Drawing Sheets

BRUSHLESS MOTOR WITH AN IMPROVED CONNECTOR TERMINAL

BACKGROUND OF THE INVENTION

The present invention relates to the construction of a brushless motor for use in a disc-driving apparatus or the like employed mainly in an information processing field.

Figure 13:
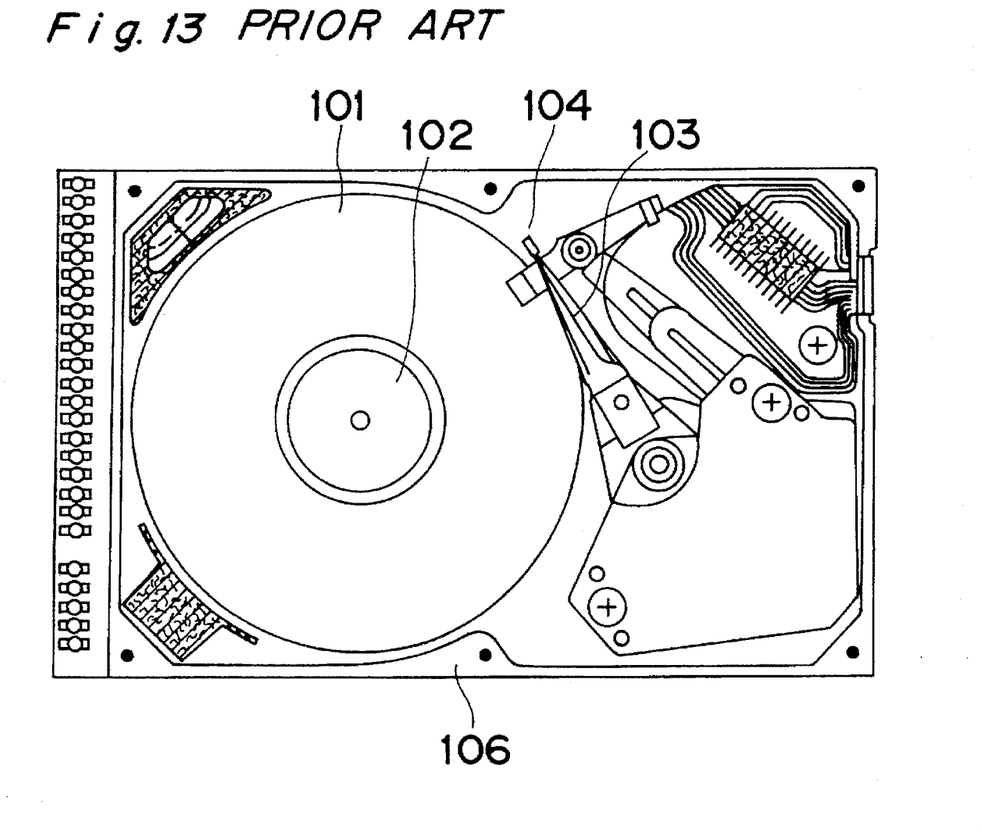
FIG. 13 is a plan view showing a conventional magnetic disc-driving apparatus.
Figure 14:
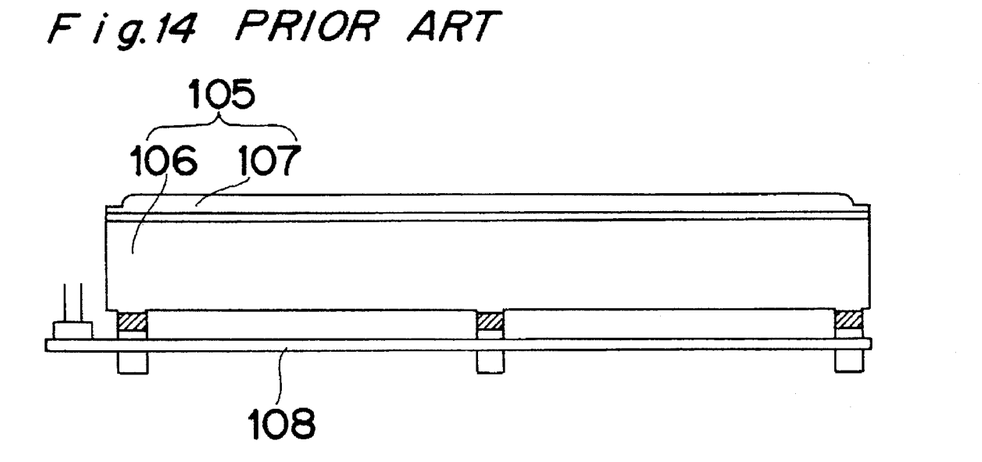
FIG. 14 is a side view showing the conventional magnetic disc-driving apparatus in FIG. 13.

In recent years, there have been increasing developments of disc-driving apparatuses which are compact and of high density. FIGS. 13 and 14 show a representative example of a product in the field relating to the present invention. The product shown in FIGS. 13 and 14 is a 2.5-inch magnetic disc-driving apparatus developed by PrairieTek Corp. of the U.S.A. The drawings of FIGS. 13 and 14 are copied from a catalog of the product. There are demands for the development of portable type apparatuses having high quality, namely, apparatuses which are compact, resistant to shock, make little noise, vibrate little, and consume a small amount of electricity. Needless to say, there are also demands for the development of a high quality brushless motor (abbreviated as "motor" in descriptions made below) for rotating a disc. Manufacturers are conducting research to comply with the above demands. Further, it is necessary for manufacturers to improve productivity not only in producing motors but also in assembling apparatuses.

A bearing is one of the elements which determines the performance of the motor. As in the apparatus shown in FIGS. 13 and 14, a ball bearing has been conventionally used as the bearing. A dynamic pressure fluid bearing has drawn attention and has been adopted as a bearing which complies with the demands at a high level. The dynamic pressure fluid bearing comprises a cylindrical shaft; a hollow cylindrical metal sleeve fitted thereon with a gap provided therebetween; and a herringbone groove provided on the shaft or the sleeve. Lubricating fluid (oil) is filled in the gap. With the rotation of a rotor, pressure is generated in the fluid, thus supporting the rotor. Theoretically, the dynamic pressure fluid bearing is superior as the bearing of the apparatus according to the present invention, because the mechanism thereof has a small volume; makes little noise because the rotor is supported through oil; is resistant to shock; is not subject to the shaft becoming significantly eccentric due to intergration effect because the load is received by the entire periphery of the shaft. The dynamic pressure fluid bearing has, however, a disadvantage that the performance thereof deteriorates when oil becomes scanty and that an apparatus is polluted by oil which flows out therefrom. Thus, it is necessary to solve this problem.

In addition to solving the problem of the dynamic pressure fluid bearing having a smaller volume and making less noise than the ball bearing, improvements are desired for other constituent elements of the motor. More specifically, there are demands in particular for an improvement in the winding density of a coil and a reduction in the vibration of a bracket and the like.

There is also a demand for an improvement in the construction of a portion for electrically connecting a member of the motor of a disc-driving apparatus and a control circuit thereof with each other. Conventionally, a terminal wire (called a lead wire in the followings description of a driving coil is manually connected with a printed wiring board by soldering. But recently, it has become very difficult to perform this operation due to the miniaturization of the motor, and hence the development of a novel connection method is desired. Conventionally, a flexible substrate and a connector are used to connect the coil and the control circuit, which makes it difficult to automate the connection between the connector and the control circuit. The miniaturization of the motor and the apparatus causes another problem in that the volume of the flexible substrate and that of the connector are great relative to the volume of the motor and that of the apparatus.

Further, a hole used to insert the flexible substrate into the motor and remove it therefrom is sealed with sealing agent consisting of adhesive agent to prevent air from permeating thereinto. Thus, skilled work and much time are required to seal the hole.

In addition, it is important to prevent the quality of the motor from being deteriorated in the process of assembling the motor. The motor constituting the disc-driving apparatus is composed of precision parts, for example, the bracket, but the precision of the parts may be degraded when handled in the assembling operation. The bracket constitutes the base of the motor, thus frequently contacting a motor-placing platform. Therefore, there is a possibility that the finished surface of the bracket will be damaged or soiled. Thus, before a product is shipped, whether or not the finished surface of the bracket has been damaged or soiled is checked with a microscope. In this situation, the development of damage-preventing countermeasures is desired.

SUMMARY OF THE INVENTION

The present invention is intended to solve the above-described problems of the conventional motor, namely, the problem of performance deterioration of the dynamic pressure fluid bearing caused by outward flow of oil from the dynamic pressure fluid bearing; low winding density of a coil; high noise levels generated by vibration; inefficiency of the operation for connecting a circuit for driving a motor and the coil installed inside the motor with each other; inefficient air-sealing operation; and a large volume of an electrical connection construction.

It is therefore an object of the present invention to provide an improved brushless motor and a disc-driving apparatus which is compact, has a high output and performance, and is manufactured with a high productivity.

In accomplishing these and other objects, according to a first aspect of the present invention, there is provided a brushless motor comprising: a coil for energizing a motor to thereby rotate a rotor of the motor; a core having a plurality of projection poles around which the coil is wound; a terminal pin serving as a relay in feeding electric current to the coil; a lead wire extending from a terminal end of the coil; and a bracket for fixedly holding the core, wherein the lead wire is electrically connected with the terminal pin directly or indirectly fixed to the core; and the terminal pin is extended to outside of the motor through a through-hole of the bracket so as to electrically connect a motor driving circuit with each other.

According to a second aspect of the present invention, there is provided a brushless motor comprising: a coil for energizing a motor to thereby rotate a rotor of the motor; a core having a plurality of projection poles around which the coil is wound; a terminal pin serving as a relay in feeding electric current to the coil; two or more insulators for insulating the core and other members from the coil; and an engaging portion, formed on the terminal pin, having a configuration different from the configurations of other portions of the engaging portion, the engaging portion being disposed between end faces of portions, of the two insulators, opposed to each other to limit movement of the terminal pin in an axial direction thereof.

According to a third aspect of the present invention, there is provided a brushless motor comprising: a coil for energizing a motor to thereby rotate a rotor of the motor; a core having a plurality of projection poles around which the coil is wound; and a terminal pin serving as a relay in feeding electric current to the coil, a part of the terminal pin being rectangular in section.

According to a fourth aspect of the present invention, there is provided a brushless motor comprising: a coil for energizing a motor to thereby rotate a rotor of the motor; a core having a plurality of projections around which the coil is wound; a terminal pin serving as a relay in feeding electric current to the coil; a terminal holder for fixedly holding the terminal pin on the core; and an engaging projection, formed on the terminal pin, having a configuration different from configurations of other portions in a vicinity of the engaging portion, wherein the engaging projection of the terminal pin is brought into contact with an outer end face, of the terminal holder, opposed to an outer periphery of the motor so as to limit a movement of the terminal pin in an axial direction thereof.

According to a fifth aspect of the present invention, there is provided a brushless motor comprising: a coil for energizing a motor to thereby rotate a rotor of the motor; a core having a plurality of projection poles around which the coil is wound; a terminal pin serving as a relay in feeding electric current to the coil; a terminal holder for fixedly holding the terminal pin on the core; and an engaging portion, formed on the terminal pin, having a configuration different from configurations of other portions in a vicinity of the engaging portion, wherein the engaging portion of the terminal pin is pressed into the terminal holder so as to limit movement of the terminal pin in an axial direction thereof.

According to a sixth aspect of the present invention, there is provided a brushless motor comprising: a coil for energizing a motor to thereby rotate a rotor of the motor; and a core having a plurality of projection poles around which the coil is wound, a width of the core projection pole on an inner peripheral side thereof being smaller than a width on the outer peripheral side thereof by 0.1 mm or more.

According to a seventh aspect of the present invention, there is provided a brushless motor comprising: a coil for energizing a motor to thereby rotate a rotor of the motor; and a core having a plurality of projection poles around which the coil is wound, wherein the coil being wound from an outer peripheral side of the core projection pole toward an inner peripheral side thereof is jumped to the outer peripheral side thereof halfway and wound toward the inner peripheral side thereof.

According to an eighth aspect of the present invention, there is provided a brushless motor comprising: a coil for energizing a motor to thereby rotate a rotor of the motor; a core having a plurality of projection poles around which the coil is wound; and a bracket for fixedly holding the core, wherein a thickness of an inner peripheral side of a bottom wall of the bracket is greater than a thickness of an outer peripheral side of the bottom wall thereof by 0.2 mm or more.

According to a ninth aspect of the present invention, there is provided a brushless motor comprising: a bracket for fixedly holding a shaft; and a rotary sleeve tapered and surrounding the shaft with a certain gap provided between the shaft and the sleeve, wherein the gap is so formed that a distance between an end face of the sleeve and a member opposed thereto on an inner peripheral side of the sleeve is smaller than a distance on an outer peripheral side of the sleeve by 0.03 mm or more.

According to a tenth aspect of the present invention, there is provided a brushless motor comprising: a bracket for fixedly holding a shaft; a rotary sleeve tapered and surrounding the shaft with a certain gap provided between the shaft and the sleeve; and a stationary member spaced at a certain interval from the sleeve and surrounding an outer periphery thereof, wherein the gap is substantially cylindrical between an outer peripheral surface of the sleeve and an inner peripheral surface of the stationary member and is so formed that a distance on an end face of the sleeve is smaller than a distance on an upper end side thereof by 0.05 mm or more.

According to an eleventh aspect of the present invention, there is provided a brushless motor comprising: a bracket for fixedly holding a shaft; and a conical rotary sleeve surrounding the shaft with a certain gap provided between the shaft and the sleeve, wherein an outer diameter of the sleeve on a lower end thereof is greater than a diameter of an upper end thereof by 0.1 mm or more.

According to a twelfth aspect of the present invention, there is provided a brushless motor comprising a bracket for fixedly holding a core, wherein a cylindrical peripheral portion of the bracket is stepped in a vicinity of a bottom of the bracket such that a diameter of the stepped portion is smaller than those of other outer peripheral portions by 0.8 mm or more.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Aspects of the present invention provide various means to solve the above-described problems. The summary of the present invention is described below by itemizing the means so that the content thereof can be easily understood. That is, items (A) through (J) indicate independent aspects, respectively, of the invention, and an aspect described in an item indicated by a letter together with a numerical designation (e.g. A1) belongs to the aspect indicated by the letter.

In the description to be made below, a board of a motor control circuit is called a control board; a wire-shaped conductive member used as a relay to feed electric current from a coil installed inside a motor to the control board and vice versa is called a terminal pin; an insulation member for holding the terminal pin is called a terminal holder; a wire extended from the coil and connected with the terminal pin is called a lead wire; a plurality of coil-wound projections extending radially from the inner peripheral surface of a core and functioning as a magnetic path of a field magnet are called core projection poles; a member for insulating the core and other members from the coil to which electric current is fed is called an insulator; a member which constitutes the base of the motor and through which the motor is connected with an apparatus is called a bracket; and a cylindrical member surrounding the outer peripheral surface of a shaft with a gap provided therebetween and constituting a bearing is called a sleeve.

[Construction for directly connecting motor and control circuit with each other by means of terminal pin]

Figure 1:
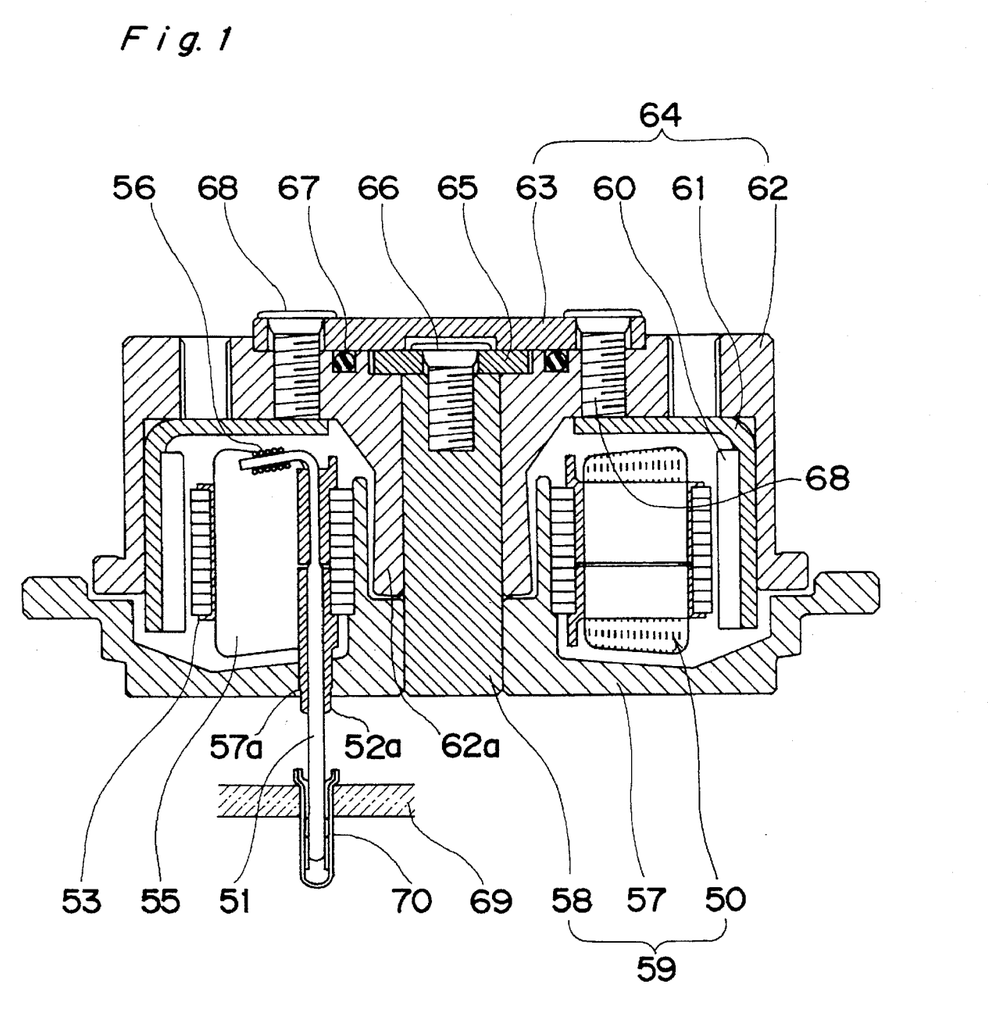
FIG. 1 is a sectional view showing a motor according to a first embodiment of the present invention and a control board.

(A): A construction in which the lead wire is connectedly wound around the terminal pin fixed to the core; and the terminal pin is axially extended to the outside of the motor to connect the terminal pin with a motor driving circuit electrically (FIG. 1).

Figure 2:
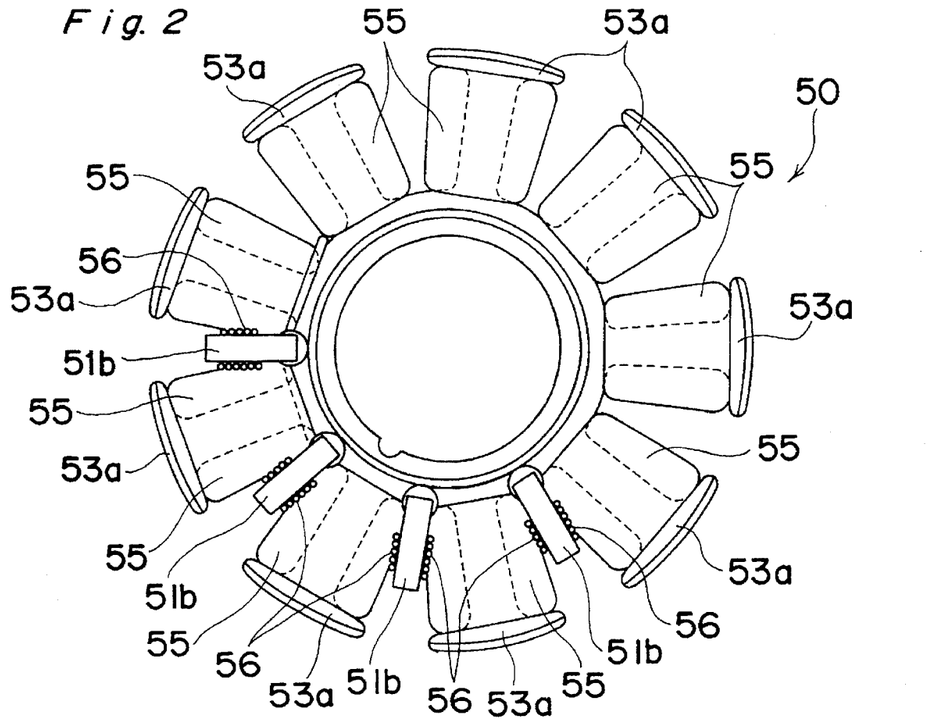
FIG. 2 is a plan view showing a coil-installed assembly of the motor in FIG. 1.
Figure 3:
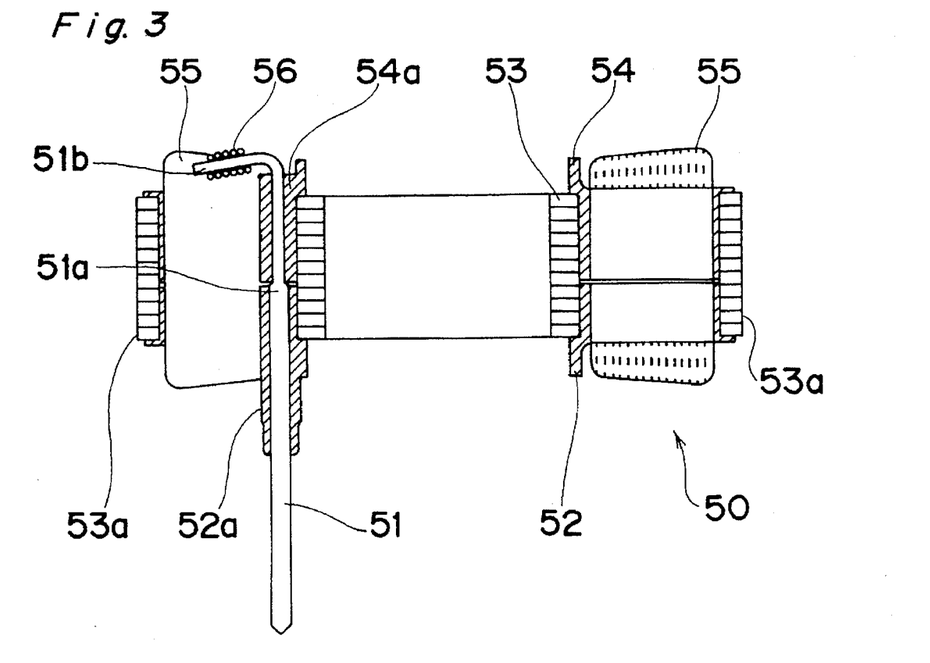
FIG. 3 is a sectional view showing the coil-installed assembly of the motor in FIG. 1.

(A1): A construction in which the terminal pin is mounted on an inner peripheral surface, of the core, disposed between the core projection poles; the lead wire is connectedly wound on one end of the terminal pin; and the other end of the terminal pin is extended to the outside of the motor (FIGS. 2, 3).

(A2): A construction in which the terminal holder is inserted into a hole of the bracket to insulate the bracket from the terminal pin and place the terminal pin in position (FIG. 1).

(A3): A construction in which the terminal holder is pressed into the hole of the bracket or attached in close contact therewith so as to keep the hole airtight (FIG. 1).

[Construction of fixing terminal pin]

(B): A construction in which an engaging projection of the terminal pin is disposed between the end faces of portions, of two insulators, opposed to each other so as to limit the movement of the terminal pin in the axial direction thereof (FIGS. 2, 3).

Figure 4:
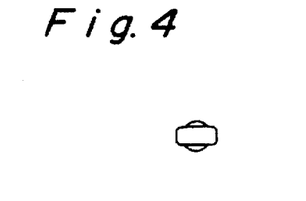
FIG. 4 is a plan view showing a terminal pin of the motor.
Figure 5:
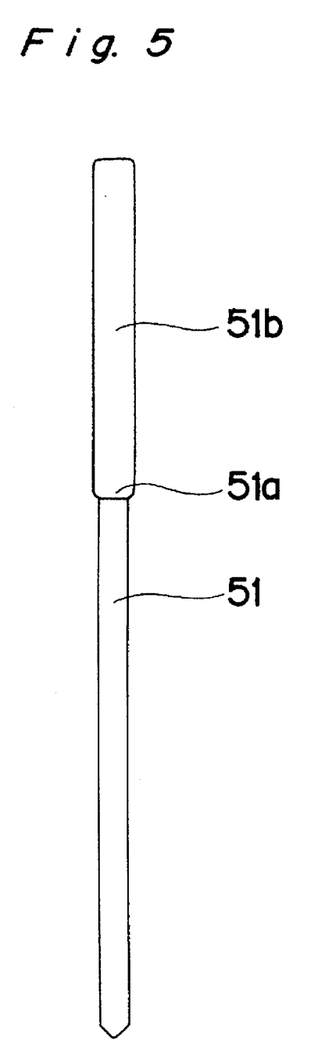
FIG. 5 is a side view showing the terminal pin of the motor.
Figure 6:
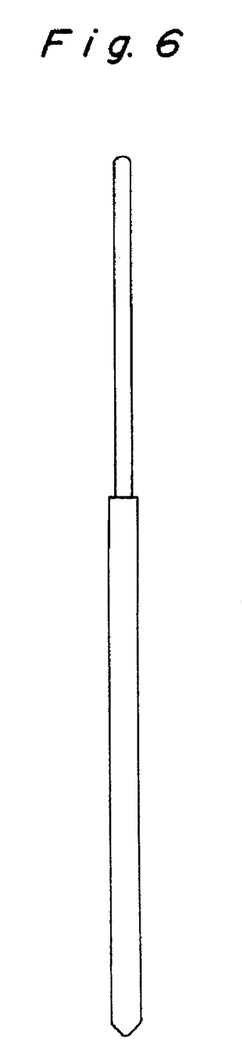
FIG. 6 is a side view showing the terminal pin rotated by 90° from the state shown in FIG. 5.

(C): A construction in which a part of the terminal pin circular or square in section is shaped into a rectangular configuration in section (FIGS. 4–6).

(D): A construction in which the engaging projection of the terminal pin is brought into contact with the outer end face of the terminal holder, namely, the side opposed to the outer periphery of the motor (FIG. 7) so as to limit the movement of the terminal pin in the axial direction thereof.

Figure 8:
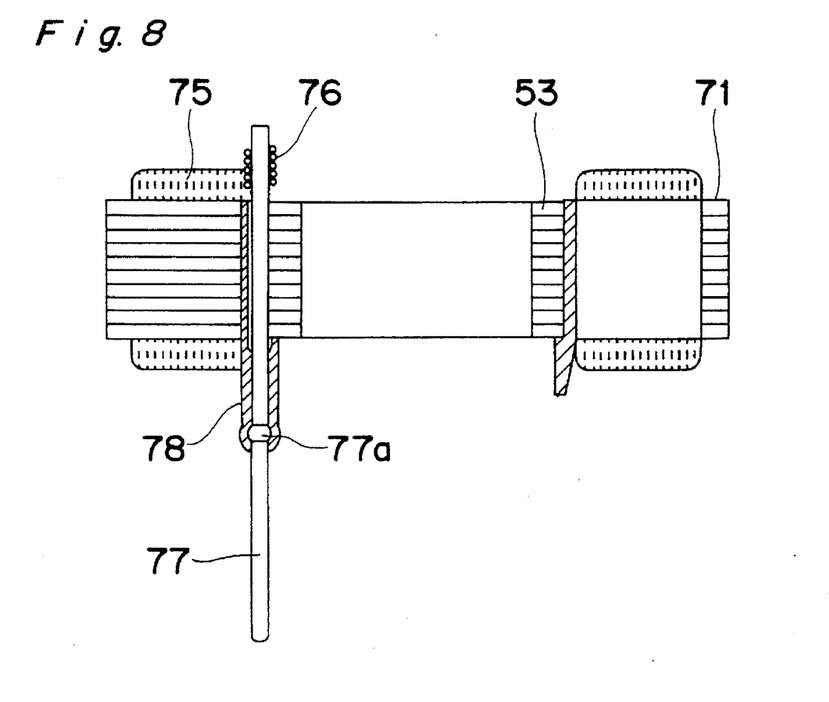
FIG. 8 is a sectional view showing a coil-installed assembly having a further alternative arrangement of the terminal pin and terminal pin mounting structure, according to the present invention.

(E): A construction in which the projection of the terminal pin is pressed into the terminal holder so as to limit the movement of the terminal pin in the axial direction thereof (FIG. 8).

[Construction for improving space factor of coil]

Figure 9:
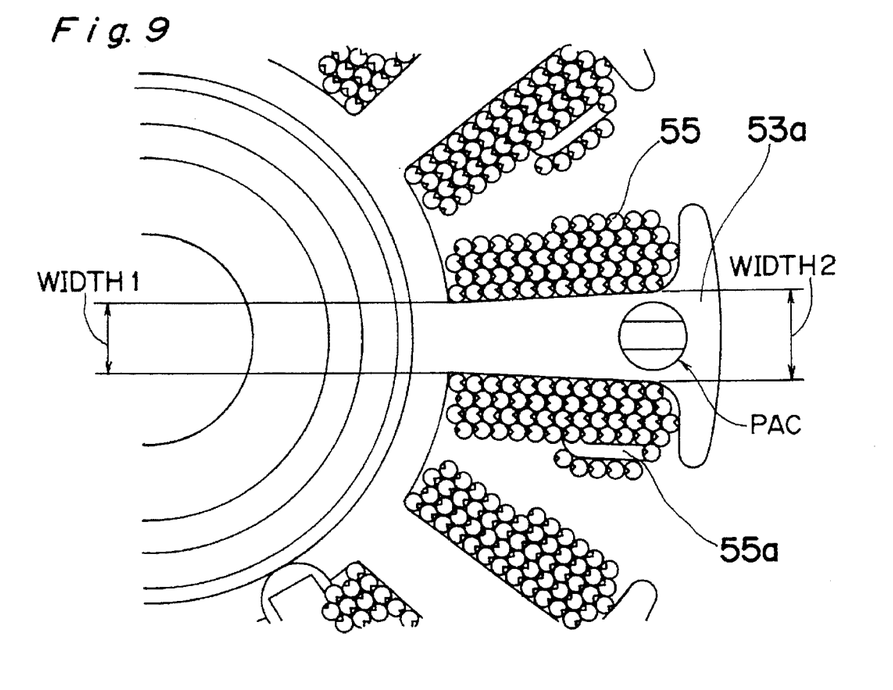
FIG. 9 is a partial plan view showing details of a coil-installed assembly and a bracket, according to the present invention.
Figure 10:
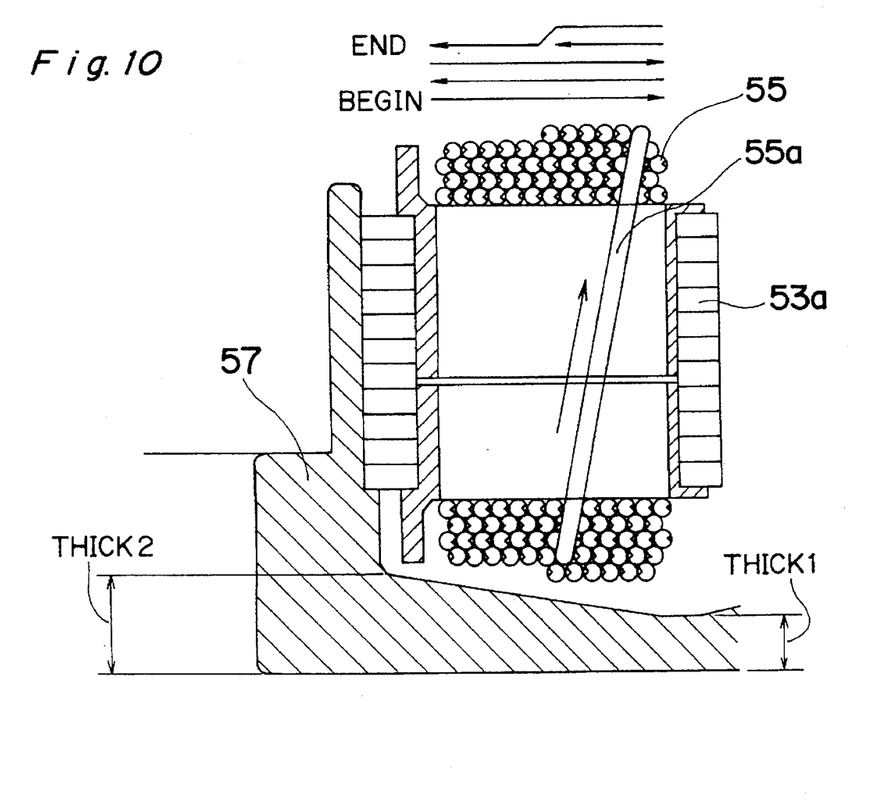
FIG. 10 is a partial sectional view of the coil-installed assembly and the bracket shown in FIG. 9.

(F): A construction in which the width of the core projection pole on the inner peripheral side thereof is gradually smaller than the width of the core projection pole on the outer peripheral side thereof in the radial direction thereof (FIGS. 9, 10).

(G): A winding method of jumping the coil being wound from the outer peripheral side of the core projection pole toward the inner peripheral side thereof to the peripheral side thereof, halfway, i.e., in the middle thereof, to the outermost peripheral side thereof, and then, winding the coil toward the inner peripheral side thereof (FIGS. 9, 10).

[Construction for improving rigidity of motor]

(H): A construction in which the thickness of the bottom of the bracket becomes greater gradually from the outer peripheral side thereof toward the inner peripheral side thereof.

[Construction for preventing outflow of oil from bearing]

Figure 11:
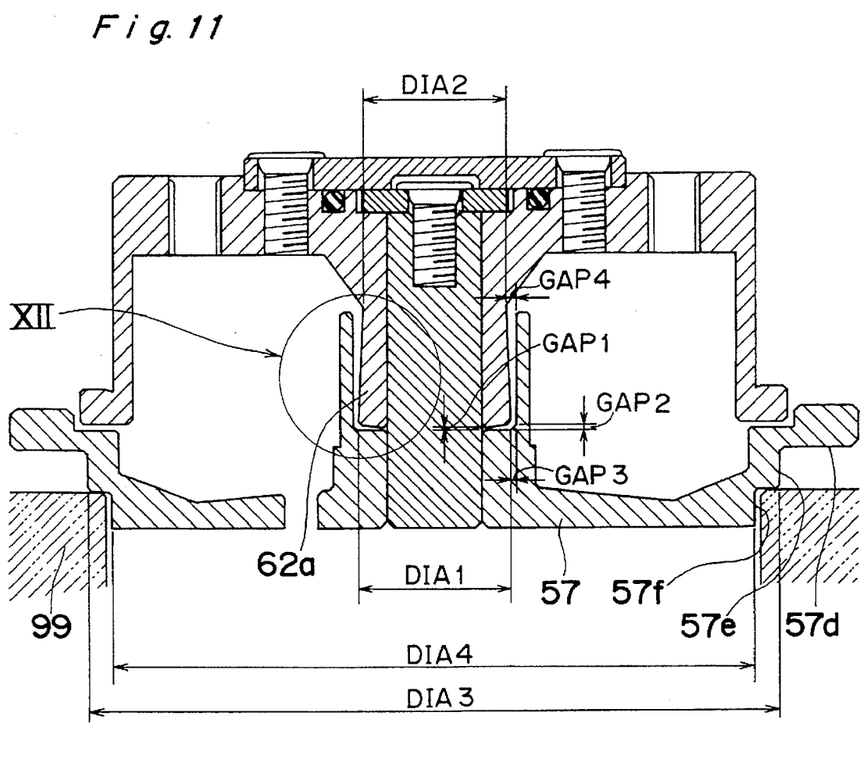
FIG. 11 is a sectional view showing details of a sleeve and a bracket and members disposed in the vicinity thereof, according to the present invention.
Figure 12:
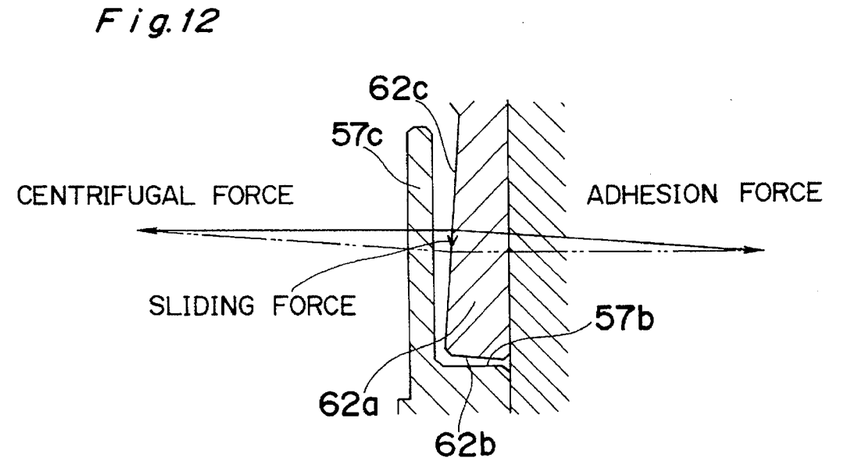
FIG. 12 is a partially enlarged view of the sleeve and members in the vicinity thereof shown in FIG. 11.

(J): A construction in which a gap between an end face of the sleeve and a member opposed thereto is set to be gradually smaller from the outer peripheral side of the sleeve toward the inner peripheral side thereof in the radial direction thereof (FIGS. 11, 12).

(K): A construction in which a gap between the outer peripheral surface of the sleeve and a member opposed thereto is set to be gradually smaller toward the side of an opening of the sleeve, i.e., from the upper end of the sleeve toward the lower end thereof in the axial direction thereof (FIGS. 11, 12).

(L): A construction in which the outer diameter of the sleeve is set to be gradually smaller from the lower end thereof toward the upper end thereof (FIGS. 11, 12).

[Construction for preventing finished surface of bracket from being damaged]

(M): A construction in which the bracket is stepped on a cylindrical peripheral portion thereof at the outer periphery of the bottom thereof (FIGS. 11, 12).

Because various means for solving the above-described problems have been described, the operation of each means will be described below.

In the aspect of the invention described in the item (A), the terminal pin connected with the lead wire is extended to the outside of the motor to directly connect the terminal pin with a control circuit disposed outside. The terminal pin is mounted on the core. Then, the coil is wound around the core and at the same time, the lead wire is wound around the terminal pin to connect the lead wire with the terminal pin electrically by means of soldering or the like. Then, the terminal pin is inserted through the hole formed in the bracket so as to project outwardly from the motor. The terminal pin is inserted into a socket contact mounted on the control board to complete the electrical connection. This construction has two operations of winding the coil around the core and connectedly winding the lead wire around the terminal pin by means of an automatic machine, and directly connecting the terminal pin with the control board. That is, the aspect of the invention described in the item (A) provides a compact and simple construction for connecting the terminal pin and the control circuit with each other.

As a preferable construction, the terminal pin is disposed in the inner peripheral surface, of the core, between the core projection poles. The lead wire is wound about and connected with one end of the terminal pin, and the other end of the terminal pin projects outwardly from the motor. This construction has advantages in that the terminal pin-mounting space can be easily constructed; the operation of connecting the lead wire and the terminal pin with each other can be easily performed by means of an automatic machine; and the position of the socket contact mounted on the control board allows parts to be mounted at high density. Needless to say, the terminal pin may be disposed in the outer peripheral side of the core depending on the required arrangement of parts of the control board.

In installing the terminal pin on the core, it is preferable to form the terminal holder on a portion of the insulator. The insulator is made of an insulating substance such as resin. The insulator has the function of guiding the coil; insulating the core from the terminal pin; insulating other members from the coil; and preventing the movement and removal of the terminal pin. Further, the construction described in the item (A) allows for the following construction: The construction (A2) in which the terminal holder is extended to be inserted into the hole of the bracket, and the construction (A3) in which the terminal holder is pressed into the hole of the bracket or attached to the hole in close contact therewith. The construction (A2) provides the advantage of insulating the bracket from the terminal pin, and placing the terminal pin in position on the control board. The construction (A3) provides the advantage of sealing the hole, thus maintaining airtightness and in addition preventing dust from penetrating into the motor or the apparatus.

The aspect of the invention described in the item (B) concerns the construction for preventing the movement of the terminal pin by means of two insulators made of resin. In order for the terminal pin to function as the connector, it is necessary to fix the terminal pin so as to prevent it from being moved or removed easily by an external force or the like. Therefore, a through-hole is formed through the insulator in the axial direction thereof so that the through-hole serves as the terminal holder into which the terminal pin is inserted. The engaging portion is formed at a portion of the terminal pin. The engaging projection of the terminal pin is disposed between the end faces of portions, of two insulators, opposed to each other. This construction causes the engaging portion to contact the end face of each hole formed on the insulator, thus preventing it from being moved in any directions.

The aspect of the invention described in the item (C) concerns the configuration of the terminal pin. When the terminal pin is used as the connector, generally, the desired sectional configuration of the material of the terminal pin is a circular or square configuration in consideration of its wide application. A part of the terminal pin, or preferably the side of the terminal pin on which the lead wire is wound, is shaped into a rectangular configuration, and the hole of the insulator is formed in conformity to the rectangular configuration of the terminal pin so as to use the hole as the guide of the terminal pin. This construction prevents the terminal pin from being rotated by tensile force generated when an end of the lead wire wound around the terminal pin is pulled. In addition, the lead wire-wound portion of the terminal pin can be bent in a desired direction. Further, the end face of the terminal pin and those of the two insulators are brought into close contact with each other by sandwiching a shape-change point of the terminal pin at which the configuration of the sectional configuration thereof is changed between the opposed portions of the two insulators. This construction prevents the terminal pin from being moved in any direction.

The aspect of the invention described in the item (D) concerns the construction for limiting the movement of the terminal pin to only one direction. When the terminal pin is used as the connector, the force acting on the terminal pin is great when the terminal pin is inserted into the connector. Thus, the engaging projection is formed on the terminal pin to bring the terminal pin into the outer end face of the terminal holder, namely, the side opposed to the outer periphery of the motor. Frictional force between the terminal pin and the terminal holder is utilized or one end of the terminal pin is bent to limit the movement thereof in the opposite direction.

Similarly to the aspect of the invention of the item (D), the aspect of the invention described in the item (E) also concerns the construction for limiting the movement of the terminal pin in the axial direction thereof. The sectional configuration of the projection may be shaped into a configuration different from that of the other portions of the terminal pin by clinching material of the pin laterally or may be shaped into a circular configuration in section to expand the terminal holder uniformly in the circumferential direction thereof. This construction has a more airtight operation than that described in the item (A).

The aspect of the invention described in the item (F) concerns the configuration of the core in a plan view to improve the characteristic of the motor. Supposing that electric current for driving the motor is constant, power consumption spent to drive the motor and heat generation caused by the use of the electric current are proportional to the resistance value of the coil. Thus, it is necessary to design the motor so that the resistance value of the coil is minimized. In order to produce the core having a configuration to improve the characteristic of the motor, the coil can be wound around it in order, and a winding space can be secured to adopt a thickest possible wire material. To this end, the width of the core projection pole on the Outer peripheral side thereof is set to be larger than the width on the inner peripheral side thereof in the radial direction thereof.

The coil is wound around the core in order from the inner peripheral side thereof. When the width of the core on the outer peripheral side is gradually increased, a component force directed toward the inner periphery of the core is generated in the first layer of the coil winding from the inner to the outer peripheral sides, due to the tensile force thereof and the tapered configuration of the core. Consequently, gaps are not generated between adjacent coils, and thus, when the first layer is wound around the core favorably, it is easy to overlay the successive layers one on the other in order.

It is preferable to make the width of the core projection pole small to secure the coil-winding space. The space for forming PAC (connecting layered cores with each other by forming projections on the cores in the thickness direction thereof) for layering the cores is required. In a small core, portions in the outer periphery of core projection poles are selected as the space for layering the cores. Therefore, the widths of the core projection poles cannot be reduced to less than the minimum value in manufacturing. In order to solve this problem, the width of the core projection poles on the inner peripheral side thereof is reduced in a range not exceeding the magnetic saturation limit, while each of the core projection poles on the outer peripheral side thereof have a width necessary for manufacture. In this manner, the core-winding space is secured.

Similarly to the aspect of the invention of the item (F), the aspect of the invention described in item (G) also concerns the construction for reducing the resistance value of the coil. That is, the aspect of the invention of the item (G) aims at improving the space factor of the coil by winding the coil in efficient arrangement and efficiently utilizing the spaces between core projection poles. When the coil is wound in a predetermined order from the inner peripheral side of the core projection pole, odd numbered layers are wound toward the outer peripheral side of the core while even number layers are wound toward the inner peripheral side thereof. If the specified number of layers is odd, normally, the coil terminates when it has been wound from the inner peripheral side of the core toward the outer peripheral side thereof. In this case, the coil on the inner peripheral side of the core is thick while the coil on the outer peripheral side thereof is thin, and the termination of the coil is at a position apart from the inner peripheral side of the core projection pole. That is, the fan-shaped space between the adjacent core projection poles is not efficiently utilized by this way of winding the coil. In order to solve this problem, the coil being wound from the outer peripheral side of the core projection pole toward the inner peripheral side thereof is at a midway point between the outer and inner peripheral rides, jumped to the outermost peripheral side thereof and then wound toward the inner peripheral side thereof. In this way of winding, a large amount of coil is wound on the outer peripheral side of the core projection pole and the termination of the coil is disposed at the innermost periphery of the core projection pole. Even though this action may be performed several times, it does not cause the coil to be wound on the core projection pole in disorder. If the resistance value of the coil is the same as the conventional one, the number of windings can be increased by an improved space factor of the coil and an output torque can be increased accordingly.

The aspect of the invention described in the item (H) concerns the construction for increasing the rigidity of the bracket. The motor for use in the apparatus according to the aspect of the present invention is required to rotate accurately to obtain a very high recording density and thus it is necessary that the motor has a low degree of vibration and a high degree of rigidity. The increase in the thickness of the bottom wall of the bracket and in particular, the increase in the thickness of the inner peripheral side thereof is effective for obtaining a high degree of rigidity and a low degree of vibration and noise. But the increase of the inner peripheral side of the bracket is contradictory to the increase in the volume of the coil of the motor. Thus, it is difficult to increase the thickness of the bottom wall of the bracket and the inner peripheral side thereof. The diameter and thickness of the coil are small on the inner peripheral side of the core projection pole by winding the coil in such a manner that the diameter thereof is large on the outer peripheral side of the core projection pole as described in the item (G). As a result, a space is provided on the bracket side, which is preferable for applying the present invention.

The aspects of the inventions described in the items (J) and (K) concerns the construction for preventing the leakage of lubricating oil filled on the dynamic pressure fluid bearing. The dynamic pressure fluid bearing of a shaft-fixing type comprises a bracket for supporting the shaft. A portion of the upper end face of the bracket is opposed to the end face of the sleeve on the opening side thereof, e.g. the lower end face of the sleeve, with a certain gap provided therebetween. Further, a vertical cylindrical portion, of the bracket, adjacent to the lower end face thereof is disposed alongside the vertical peripheral portion of the sleeve, with a certain gap provided therebetween. The space surrounded with the outer peripheral surface of the sleeve and the upper end face of the bracket has a function of reserving oil which has leaked from the bearing, preventing it from flowing out from the motor, and supplying oil to the gap between the shaft and the sleeve when oil becomes scanty. The constructions described in the items (J) and (K) enable these functions to operate efficiently.

The above-described gap between the lower end face of the sleeve and the surface, of the bracket, opposed thereto is approximately disc-shaped. The thickness of the disc is set to be smaller gradually from the outer peripheral side of the sleeve toward the inner peripheral side thereof. The gap causes the oil filled therein to be collected to the inner peripheral side of the sleeve due to a capillary phenomenon. This action allows oil to be attracted toward the bearing, thus supplying oil continuously and preventing leakage of oil.

The gap continuous with the disc-shaped gap, namely, the gap between the outer peripheral surface of the sleeve and a member or a vertical cylindrical portion of the bracket is set to be gradually smaller from the upper end of the sleeve toward the lower end face of the sleeve. As in the case of the gap between the lower end face of the sleeve and the surface, of the bracket, opposed thereto, a similar action works, thereby allowing oil to flow toward the lower end face of the sleeve.

The construction described in the item (L) is similar to that described in the item (K), but has an operation different from that of the construction described in the item (K). That is, with the rotation of the sleeve, centrifugal force acts on oil which has attached to the outer peripheral surface of the sleeve in the dynamic pressure fluid bearing of the shaft-fixing type. If the outer peripheral surface of the sleeve is conical, oil which has attached to the outer peripheral surface of the sleeve is moved toward a large-diameter portion of the outer peripheral surface of the sleeve due to the resultant force of centrifugal force and adhesion force. In consideration of this principle, the outer diameter of the sleeve at the lower end thereof is set to be larger than that of the other (upper) side thereof so as to move the oil which has attached to the outer peripheral surface thereof toward the lower end thereof. In other words, this construction has a function of moving the oil toward the center of the motor. Then, the oil moves toward the bearing due to the operation described in the item (G).

The aspect of the invention described in item (M) concerns the construction for preventing a machined surface of the bracket from being damaged. Normally, on the outer periphery of the bracket, there are formed a cylindrical guide for placing the motor in position and a ring-shaped flange, disposed adjacently to the cylindrical guide, for mounting the motor on the apparatus. The outer peripheral surface of the cylindrical guide and the lower surface of the ring-shaped flange have accurately finished surfaces, respectively. The cylindrical portion having an outer diameter approximately 1 mm smaller than that of the cylindrical guide is formed below the cylindrical guide so as to prevent the surface of the cylindrical guide and that of the ring-shaped flange from being damaged during assembly. While the motor is being moved or transported, the motor is supported by the cylindrical portion. Thus, the finished surface is not brought into contact with motor-placing platform, and hence, the finished surface can be prevented from being damaged.

The numerical values described display the apparent operations and are selected in a range which can be distinguished from errors in manufacture.

As described above, the method, according to the aspect of the present invention, of electrically connecting the motor and the control circuit with each other provides a simple connection construction for feeding electric current, a simple insulation construction, and a simple sealing construction, unlike the conventional method of electrically connecting the motor and the printed wiring board with each other. Further, the reasonable construction for fixing the terminal pin provides a stable connector function; the improved configuration of the core allows the coil to be wound around the core and layered one on the other in an improved manner and increases the space for accommodating the wound coil; the space factor of the coil can be improved by the reasonable winding pattern which effectively utilizes the space in the outer periphery of the core; and the rigidity of the motor can be increased by the favorable thickness distribution of the bracket which utilizes the advantage of the winding pattern. In addition, the mechanisms constructed in the outer periphery of the sleeve utilize the properties of oil to prevent the oil from flowing out from the bearing. Moreover, the stepped portion formed on the cylindrical portion of the bracket can prevent the bracket from being damaged.

Next, the above aspects of the present invention will be described in detail with reference to FIGS. 1–12.

FIG. 1 is a partial sectional view showing a motor and a control board according to a first embodiment of the present invention. FIG. 2 is a plan view showing a wire-installed assembly constituting the motor. FIG. 3 is a sectional view showing the assembly. FIG. 4 is a plan view showing a terminal pin. FIG. 5 is a side view showing the terminal pin. FIG. 6 is a side view showing the terminal pin rotated by 90° from the state shown in FIG. 5.

The outlook of the construction of the motor is described from the view point of its function. A shaft 58 serving as a part of a bearing is fixed to the center of a bracket 57 which supports a rotor 64. A radial bearing is constituted by the shaft 58; a rotary cylindrical sleeve 62a fitted on the shaft 58 with a certain gap therebetween; and oil (not shown) filled between the shaft 58 and the sleeve 62a. The sleeve 62a is formed integrally with the inner peripheral surface of a hub 62, thus supporting the hub 62. A collar 65 is fixed to the upper end of the shaft 58, and a thrust plate 63 disposed above the collar 65 is fixed to the hub 62. Oil is filled in gaps positioned above and below the collar 65, thus constituting a thrust bearing and functioning as a means for preventing the rotor 64 from being removed. A herringbone groove and a spiral groove are formed on the bearing surface of the radial bearing and the bearing surface of the thrust bearing, respectively. The construction of the herringbone groove and that of the spiral groove are not described below because they are not a subject of the present invention.

The force for driving the motor is generated by a rotating magnetic field generated by a core 53 excited via a coil 55 wound around the core 53 and a multipolar magnet 60 surrounding the core 53. The rotor 64 is constituted by the magnet 60, a frame 61 disposed at the periphery of the magnet 60, and the hub 62 disposed at the periphery of the frame 61. The core 53 fixed to the bracket 57 functions as the source for driving the motor. In order to feed electric current from a coil 55 to a control board 69, a lead wire 56 of the coil 55 is connected to and wound around one end of a terminal pin 51, and the other end of the terminal pin 51 is extended to the outside of the motor and connected with the control board 69.

A means for assembling the motor is described below.

Means for constituting a wire-installed assembly 50 which is one of the main parts of the motor according to the embodiment is described below with reference to FIGS. 2–6. The assembled body shown in FIGS. 2 and 3 is called the wire-installed assembly 50. As shown in FIGS. 4–6, the main portion of the terminal pin 51 is made of a metal wire circular in section, while the upper portion thereof is rectangular in section. As shown in FIGS. 2 and 3, an upper terminal holder 54a and a lower terminal holder 52a are made of synthetic resin, especially thermoplastic resin, and are formed on the inner peripheral surface of a space defined by a part of an upper insulator 54, a part of a lower insulator 52, and a core projection 53a. First, the terminal pin 51 is inserted into the lower insulator 52. Then, the core 53 and the upper insulator 54 are sequentially placed at predetermined positions. As a result, a shape-change point 51a (i.e. the junction between the rectangular cross-sectional portion and the circular cross-sectional portion) of the terminal pin 51 is fixed by being sandwiched between the upper terminal holder 54a and the lower terminal holder 52a. The upper terminal holder 54a is fixed, with a rectangular-section portion 51b of the terminal pin 51 directed radially. Then, the assembled body is set on an automatic winding apparatus so as to wind the coil 55 around each core projection pole 53a and at the same time wind a lead wire 56 disposed at both ends of the coil 55 around the rectangular-section portion 51b of the terminal pin 51. Thereafter, the lead wire 56 is soldered to the rectangular-section portion 51b, and then the rectangular-section portion 51b is bent radially to make its height lower as shown in FIG.3. Although FIGS. 2 and 3 show the state in which the rectangular-section portion 51b of the terminal pin 51 has been bent, the rectangular-section portion 51b is extended straight to facilitate the winding operation when the rectangular-section portion 51b is on the automatic winding apparatus.

A stator 59 is a general name of an assembly, disposed on the stationary side, constituted by the bracket 57, the shaft 58, and the wire-installed assembly 50. Referring to FIG. 1, first, one end of the shaft 58 is firmly fixed in a hole formed at the center of the bracket 57 by using a method such as shrinkage fitting. Then, the wire-installed assembly 50 is inserted downward into the space of the bracket 57 and fixed thereto with adhesive agent or the like. In this manner, the assembling operation is completed. At this time, the lower terminal holder 52a is penetrated into a through-hole 57a of the bracket 57 under pressure, thus preventing air from communicating between the inside and the outside of the motor through the through-hole 57a. This construction has an insulation function and allows the terminal pin 51 to be placed in position.

The rotor 64 is inserted into the assembled stator 59 to assemble the motor. The rotor 64 is a general name of an assembly, disposed on the rotational side, constituted by mainly the magnet 60, the frame 61, the hub 62, and the thrust plate 63. With fixing means such as an adhesive agent, the magnet 60 is fixed to the inner side of the frame 61, while the frame 61 is fixed to the inner side of the hub 62. Then, an appropriate amount of oil is applied to the shaft 58 on the stator side and to the bearing surface of the sleeve 62a on the rotor side. Then, the shaft 58 is inserted into the sleeve 62a to combine them with each other. Then, the collar 65 is fixed to the upper end of the shaft 58 with a screw 66, and an O-ring 67 is installed on a predetermined position. Then, oil is supplied to the upper surface of the collar 65. Then, the thrust plate 63 is fixed to the hub 62 with screws 68. In this manner, the motor assembling operation is completed.

As described above, the portion relating to the electrical connection, the portion for outwardly extending the terminal pin from the motor, and the sealing construction have a very simple construction, respectively, and thus an automatic assembly can be facilitated. The operation for electrically connecting the motor incorporated in the apparatus and the control board 69 with each other is performed by only installing a socket contact 70 on the control board 69 and inserting the terminal pin 51 into the socket contact 70. This operation is performed automatically with ease.

In the above description, the conductive member, namely, the terminal pin used as a relay for feeding electric current between the coil inside the motor and the control board is circular in section but may be in other configurations than a pin. The construction comprising a member, other than the terminal pin, for feeding electric current between the coil inside the motor and the control board can be applied in the present invention. In the above embodiment, the lead wire is wound around the terminal pin and connected therewith by soldering, but other connection methods such as welding or pressing may be used to connect both with each other. Members for insulating the bracket from the terminal pin and placing the terminal pin in position as well as the sealing member may have a construction separate from the terminal holder fixed to the core. Such a construction is included in the present invention.

A brushless motor having an alternative arrangement of the terminal pin and terminal pin mounting structure according to the present invention is described below with reference to FIG. 7.

Figure 7:
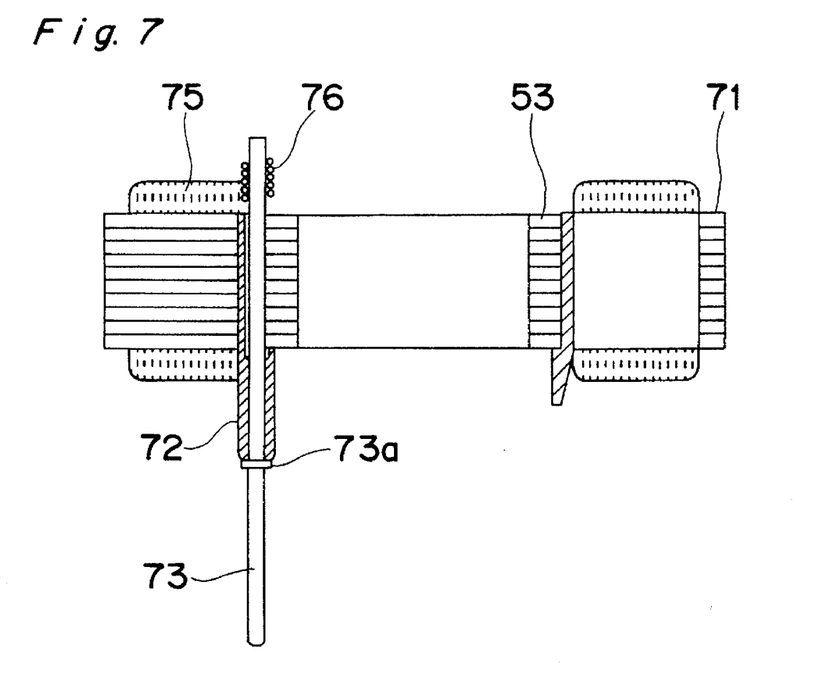
FIG. 7 is a sectional view showing a coil-installed assembly of a motor having an alternative arrangement of the terminal pin and terminal pin mounting structure, according to the present invention.

The method of fixing the terminal pin as shown in FIG. 7 is different from that shown in FIGS. 1 and 3. Insulation paint 71 is applied to the peripheral surface of the core 53 instead of utilizing the insulator. A terminal holder 72 and a terminal pin 73 are installed on the core 53. A projection 73a is formed on the terminal pin 73 at a portion thereof on the outer side of the motor. The projection 73a contacts the end face of the terminal holder 72, thus preventing the terminal pin 73 from being moved. The coil 75 and the lead wire 76 are wound around the core 53 and the terminal pin 73, respectively. In this manner, the winding operation is completed.

A brushless motor having a further alternative arrangement of the terminal pin and terminal pin mounting structure according to the present invention is described below with reference to FIG. 8.

FIG. 8 shows another method of fixing a terminal pin. In this arrangement, a small projection 77a formed on a terminal pin 77 is inserted into a terminal holder 78 so as to prevent the terminal pin 77 from moving in the axial direction thereof. Other constructions are similar to those of the second embodiment shown in FIG. 7.

A brushless motor according to a fourth embodiment of the present invention is described below with reference to FIGS. 9 and 10.

FIGS. 9 and 10 are enlarged views showing in detail a part of the coil-installed assembly shown in FIGS. 2 and 3. A PAC for connectedly laminating the cores 53 one on the other is mounted on the outer side of the core projection pole 53a. A width (Width 2) of the core projection pole 53a on the outer peripheral side thereof is greater than the width (Width 1) on the inner peripheral side thereof. Preferably, the width (Width 1) of the core projection pole 53a on the inner peripheral side thereof is smaller than the width (Width 2) on the outer peripheral side thereof by 0.1 mm or more. This configuration secures the space for performing PAC and the winding space on the inner peripheral side of the core projection pole 53a, and allows the coil 55 to be wound in order.

The coil 55 is wound around the core 53 in five layers. The winding pattern of the coil 55 is different from the conventional reciprocation type in the fourth and fifth layers of the coil 55. That is, in the fourth layer, a coil 55a is wound from the outer peripheral side of the core projection pole 53a toward the inner peripheral side thereof but jumped to the outer peripheral side thereof and then further wound toward the inner peripheral side thereof. In this winding pattern, the termination end of the coil 55a is positioned on the inner peripheral side of the core projection pole 53a, and a large amount of the coil 55 is distributed to the outer peripheral side of the core projection pole 53a. This construction does not cause the arrangement of the coil 55 to be in disorder. This construction improves the performance of the motor by 10–20% compared with the conventional construction.

FIGS. 9 and 10 are a partial sectional views showing the bracket 57 as well as the coil-installed assembly. The thickness (Thick 2) of the bottom wall of the bracket 57 on the inner peripheral side thereof is set to be greater than the thickness (Thick 1) of the bottom wall of the bracket 57 on the outer peripheral side thereof so as to improve the rigidity of the bracket 57. The distribution of a large amount of the coil 55 to the outer peripheral side of the core projection pole 53a provides a space in the vicinity of the inner peripheral side thereof. Preferably, the thickness (Thick 2) of the inner peripheral side of the bottom wall of the bracket 57 is greater than a thickness (Thick 1) of an outer peripheral side of the bottom wall thereof by 0.2 mm or more. This configuration allows the winding space to be secured on the inner peripheral side of the core projection pole and the coil 55 to be wound in order while being viewed from the side of the bracket 57.

The increase of the thickness of the bottom wall of the bracket 57 from the outer peripheral side thereof toward the inner peripheral side thereof may be continuous or stepped.

Details of a sleeve, bracket and members in the vivinity thereof for the brushless motor according to the present invention are described below with reference to FIGS. 11 and 12. This description concerns the invention regarding the periphery of the sleeve 62a and the bracket 57. FIG. 11 is a sectional view showing the whole of the sleeve 62a and the bracket 57. FIG. 12 is an enlarged sectional view showing the periphery of the sleeve 62a encircled by XII in FIG. 11. In the gap between the lower end face 62b of the sleeve 62a and the upper end face 57b, of the bracket 57, opposed to the lower end face 62b, a gap (Gap 2) on the outer peripheral side of the sleeve 62a is greater than a gap (Gap 1) on the inner peripheral side thereof. Preferably, the distance of the gap (Gap 1) between the lower end face of the sleeve 62a and the member opposed thereto on the inner peripheral side of the sleeve 62a is smaller than the distance of the gap (Gap 2) on the outer peripheral side of the sleeve 62a by 0.03 mm or more. In this construction, surface tension of oil causes the oil to move to the inner peripheral side of the sleeve 62a.

The principal object of the provision of a cylindrical portion 57c of the bracket 57 is to fix the core 53. In order to obtain the same effect, an appropriate gap is provided between the cylindrical portion 57c and an outer peripheral surface 62c of the sleeve 62a. That is, a gap (Gap 3) disposed at the lower end face 62b of the sleeve 62a is set to be smaller than a gap (Gap 4) disposed on the upper end face of the sleeve 62a. Preferably, the gap is substantially cylindrical between the outer peripheral surface of the sleeve 62a and the inner peripheral surface of the stationary member and is so formed that the distance of the gap (Gap 3) on the lower end face of the sleeve 62a is smaller than the distance of the gap (Gap 4) on the upper end side thereof by 0.05 mm or more.

Further, the outer diameter (Dia 1) of the sleeve 62a at the lower end face 62b of the sleeve 62a is greater that the outer diameter (Dia 2) at the upper end face thereof, preferably, by 0.1 mm or more. FIG. 12 shows the effect to be obtained by this construction. That is, centrifugal force acts on oil which has attached to the outer peripheral surface 62c of the sleeve 62a, while the oil is sucked to the outer peripheral surface 62c by adhesion force acting in the direction perpendicular to the vertical surface of the sleeve 62a. Because the outer peripheral surface 62c of the sleeve 62a is inclined, the resultant vector of both forces becomes a sliding force. Accordingly, the oil moves along the outer peripheral surface 62c of the sleeve 62a as shown in an arrow in FIG. 12. That is, the oil which has attached to the outer peripheral side 62c of the sleeve 62a moves toward the lower end face 62b thereof.

Although it is most favorable that a part of the bracket 57 confronts the sleeve 62a, a member separate from the bracket 57 may be provided to confront the sleeve 62a.

An installation reference plane to install the motor is set on the bracket 57. That is, the lower surface 57d of the outer peripheral portion of the bracket 57 and the cylindrical outer peripheral portion 57e have a finished surface with high accuracy. In order to prevent the motor from contacting the lower surface 57d and the cylindrical outer peripheral portion 57e to the utmost, a cylindrical peripheral portion 57f having a small diameter is formed below the cylindrical outer peripheral portion 57e. That is, the diameter (Dia 4) of the cylindrical peripheral portion 57f is smaller the diameter (Dia 3) of the cylindrical peripheral portion 57e by approximately 1 mm or more. In mounting the motor on the bracket 57, the cylindrical portion 57f is contacted by the motor-placing platform 99. Preferably, the cylindrical peripheral portion 57f of the bracket 57 is stepped in the vicinity of the bottom of the bracket 57 such that the diameter (Dia 4) of the stepped portion is smaller than those (Dia 3) of other outer peripheral portions by 0.8 mm or more.

Although the description has been made by selecting examples easy to understand, it is to be noted that various changes and modifications will be apparent to those skilled in the art so far as they are included within the scope of the present invention.

As described above, the method, according to the present invention, of directly connecting the motor and the control circuit with each other by means of the terminal pin provides a very simple connection construction for feeding electric current, a very simple electrical insulation construction, and a very simple sealing construction. These constructions allow assembling processes to be greatly reduced and the motor and the apparatus to be miniaturized, and moreover allow the space in the motor to be utilized efficiently. The space factor of the coil improves the performance of the motor by 10–20% over the conventional motor. The increased rigidity of the motor leads to generation of a low degree of vibration and low noise. In addition, the oil outflow-preventing construction of the bearing enables the motor to be driven reliably. Moreover, the stepped portion of the bracket prevents the bracket from being damaged, thus maintaining the accuracy and quality of the motor.

Owing to the above-described operation and effect, the motor and the disc-driving apparatus with the motor are compact and have a high output, outstanding performance, and high productivity, thus comprising the demands.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A brushless motor comprising:
   a bracket;
   a core fixed to said bracket and having a plurality of projection poles;
   an energization coil wound about said projection poles;
   a lead wire extending from a terminal end of said coil;
   a terminal holder, discrete from said bracket, mounted to said core and having a terminal pin-receiving hole;
   a terminal pin mounted in said terminal pin-receiving hole of said terminal holder, said terminal pin having first and second ends;
   wherein said first end of said terminal pin is electrically connected to said lead wire;
   wherein said bracket has a through-hole formed therein;
   wherein said terminal holder has a first end portion and a second end portion, said second end portion being adjacent said through-hole of said bracket; and
   wherein said terminal pin extends through said second end portion of said terminal holder via said terminal pin-receiving hole thereof, and said terminal pin extends through said through-hole of said bracket, such that said second end of said terminal pin is disposed on a side of said bracket opposite said first end of said terminal pin.

2. A brushless motor as recited in claim 1, wherein said terminal holder is formed of an electrically insulating material.

3. A brushless motor as recited in claim 1, wherein said terminal holder extends into said through-hole of said bracket.

4. A brushless motor as recited in claim 3, wherein said terminal holder seals said through-hole of said bracket in an airtight manner.

5. A brushless motor as recited in claim 1, wherein said terminal holder extends through said through-hole of said bracket.

6. A brushless motor as recited in claim 5, wherein said terminal holder seals said through-hole of said bracket in an airtight manner.

7. A brushless motor as recited in claim 1, wherein said terminal holder seals said through-hole of said bracket in an airtight manner.

8. A brushless motor as recited in claim 1, wherein said terminal holder comprises two discrete terminal holder members having mutually facing ends.

9. A brushless motor as recited in claim 8, wherein said terminal pin has an engaging portion formed thereon, said engaging portion being disposed between said mutually facing ends of said two discrete terminal holder members to limit longitudinal movement of said terminal pin relative to said terminal holder.

10. A brushless motor as recited in claim 9, wherein said terminal pin has a first longitudinal portion of a first cross-sectional shape, and a second longitudinal portion of a second cross-sectional shape different than said first cross-sectional shape, a shoulder being formed between said first and second longitudinal portions; and
said engaging portion of said terminal pin is constituted by said shoulder.

11. A brushless motor as recited in claim 10, wherein one of said first and second cross-sectional shapes is rectangular.

12. A brushless motor as recited in claim 11, wherein the other of said first and second cross-sectional shapes is circular.

13. A brushless motor as recited in claim 1, wherein a longitudinal portion of said terminal pin is rectangular in cross section.

14. A brushless motor as recited in claim 1, wherein said terminal pin has an engaging projection formed thereon, and said engaging projection is contacted against an end face of said second end portion of said terminal holder to limit longitudinal movement of said terminal pin relative to said terminal holder.

15. A brushless motor as recited in claim 1, wherein said terminal pin has a radially projecting engaging portion formed thereon; and said engaging portion of said terminal pin is press fitted in said terminal pin-receiving hole of said terminal holder to limit longitudinal movement of said terminal pin relative to said terminal holder.

16. A brushless motor as recited in claim 1, wherein said terminal pin is mounted on an inner peripheral surface of said core between an adjacent pair of said core projection poles; and said lead wire is wound about an end of said terminal pin.

17. A brushless motor comprising:

a bracket;

a core fixed to said bracket and having a plurality of projection poles;

an energization coil wound about said projection poles;

a lead wire extending from a terminal end of said coil;

a terminal holder, discrete from said bracket, mounted to said core and having a terminal pin-receiving hole;

a terminal pin mounted in said terminal pin-receiving hole of said terminal holder, said terminal pin having first and second ends;

wherein said first end of said terminal pin is electrically connected to said lead wire;

wherein said bracket has a through-hole formed therein;

wherein said terminal pin extends through said through-hole of said bracket, such that said second end of said terminal pin is disposed on a side of said bracket opposite said first end of said terminal pin;

wherein said terminal holder comprises two discrete terminal holder members having mutually facing ends; and wherein said terminal pin has an engaging portion formed thereon, said engaging portion being disposed between said mutually facing ends of said two discrete terminal holder members to limit longitudinal movement of said terminal pin relative to said terminal holder.

18. A brushless motor as recited in claim 17, wherein said terminal pin has a first longitudinal portion of a first cross-sectional shape, and a second longitudinal portion of a second cross-sectional shape different than said first cross-sectional shape, a shoulder being formed between said first and second longitudinal portions; and said engaging portion of said terminal pin is constituted by said shoulder.

19. A brushless motor as recited in claim 18, wherein one of said first and second cross-sectional shapes is rectangular.

20. A brushless motor as recited in claim 19, wherein the other of said first and second cross-sectional shapes is circular.

* * * * *